United States Patent
DeCusatis et al.

(10) Patent No.: US 7,031,619 B2
(45) Date of Patent: *Apr. 18, 2006

(54) METHOD AND SYSTEM FOR DISPERSION CONTROL OF ELECTROMAGNETIC SIGNALS IN COMMUNICATION NETWORKS

(75) Inventors: Casimer M. DeCusatis, Poughkeepsie, NY (US); Lawrence Jacobowitz, Wappinger Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 547 days.

This patent is subject to a terminal disclaimer.

(21) Appl. No.: 09/891,895

(22) Filed: Jun. 26, 2001

(65) Prior Publication Data

US 2002/0196503 A1    Dec. 26, 2002

(51) Int. Cl.
   *H04B 10/04*   (2006.01)
(52) U.S. Cl. ............ 398/196; 398/182; 398/183; 398/185; 398/186; 398/187; 398/188; 398/189; 398/192; 398/193; 398/194; 398/195; 398/197; 398/118; 372/20; 372/32; 372/38; 372/29.01
(58) Field of Classification Search ........ 398/180, 398/182, 200, 201, 195, 186, 192, 196, 198, 398/147, 193, 197, 183, 185, 187, 188, 189, 398/194; 370/20, 32, 38, 29.01; 372/20, 372/32, 38, 29.01
See application file for complete search history.

(56) References Cited

U.S. PATENT DOCUMENTS 5,777,773 A * 7/1998 Epworth et al. ............ 398/185
5,892,606 A * 4/1999 Fatehi et al. ............... 398/181
6,222,861 B1 * 4/2001 Kuo et al. .................... 372/20
6,396,603 B1 * 5/2002 Kim ............................ 398/91
6,535,532 B1 * 3/2003 Ackerman et al. .......... 372/32
6,597,840 B1 * 7/2003 Jacobowitz et al. ........ 385/37
6,643,424 B1 * 11/2003 Jacobowitz et al. ........ 385/16
6,654,152 B1 * 11/2003 Jacobowitz et al. ...... 359/240
6,674,936 B1 * 1/2004 Jacobowitz et al. ........ 385/24
6,724,786 B1 * 4/2004 Jacobowitz et al. ........ 372/20
6,738,187 B1 * 5/2004 DeCusatis et al. ........ 359/344
6,751,014 B1 * 6/2004 DeCusatis et al. ..... 359/341.41

(Continued)

OTHER PUBLICATIONS

Bann, R., et al., "Micromachining system accomodates large wafers," Laser Focus World, www.optoelectronics-world.com, pp. 189-192, Jan. 2001.

(Continued)

*Primary Examiner*—Hanh Phan
(74) *Attorney, Agent, or Firm*—Scully, Scott, Murphy & Presser; Joseph P. Abate

(57) ABSTRACT

A method and system for dispersion control of electromagnetic signals in communication networks by narrowing the widths of electromagnetic pulses such as modulated laser signals. Generally, in the preferred embodiment, the present invention utilizes a feedback loop based on dither frequency modulation which dynamically adjusts the alignment of the laser center frequency with the filter passband. In this way, there is an acceptable tradeoff between optical power and pulse width, so a higher power laser can be used to generate a narrower optical pulse. The narrower pulses then travel farther in the fiber link before reaching their dispersion limit. It is believed that, by using this invention, existing link distance could be doubled, while re-using existing installed singlemode fiber. The systems employing the feedback loop may be information carrying or control systems.

18 Claims, 3 Drawing Sheets

U.S. PATENT DOCUMENTS

| | | | |
|---|---|---|---|
| 6,816,517 B1* | 11/2004 | Jacobowitz et al. | 372/20 |
| 2002/0176457 A1* | 11/2002 | DeCusatis et al. | |
| 2003/0002138 A1* | 1/2003 | DeCusatis et al. | 359/334 |
| 2003/0043862 A1* | 3/2003 | Jacobowitz et al. | 372/20 |
| 2003/0058510 A1* | 3/2003 | Jacobowitz et al. | 359/187 |
| 2003/0059157 A1* | 3/2003 | DeCusatis et al. | 385/24 |
| 2003/0072333 A1* | 4/2003 | Jacobowitz et al. | 372/20 |
| 2003/0072869 A1* | 4/2003 | DeCusatis et al. | 427/8 |
| 2003/0081281 A1* | 5/2003 | Decusatis et al. | |

OTHER PUBLICATIONS

Kartalopoulos, S.,"Introduction to DWDM Technology Data in a Rainbow," IEEE, Chapter 3, pp. 67-68, (1999).

Kartalopoulos, S., "Other Optical Components," IEEE, Chapter 9, pp. 131-137, (1999).

Carroll, J., et al.,"Distributed feedback semiconductor lasers," IEE Circuits, Devices and Systems Series 10, SPIE Press Monograph, vol. PM52, pp 9-15, (1998).

* cited by examiner

METHOD AND SYSTEM FOR DISPERSION CONTROL OF ELECTROMAGNETIC SIGNALS IN COMMUNICATION NETWORKS

BACKGROUND OF THE INVENTION

1. Field of the Invention

This invention generally relates to methods and systems that generate and process electromagnetic signals in the radio frequency, microwave and optical frequency spectra. More specifically, the invention relates to such methods and systems that modulate these electromagnetic signals and prepare the modulated signals for transmission over significant distances. Even more specifically, the present invention relates to such method and systems that are particularly well suited for enabling such electromagnetic signals to carry data at a rate of forty gigabits and above for long distances.

2. Description of the Prior Art

The demand for bandwidth has driven the introduction of higher data rate protocols such as ten Gigabit Ethernet technology and Synchronous Optical Networks (SONET). Serial links at this data rate are limited by dispersion to a few km's on singlemode fiber; the next generation of forty Gbit/s and beyond data links will face even more severe distance limitations. Because this limit is caused by dispersion, not link budget, it cannot be overcome by a brute force approach of increasing the laser power. In any case, high power lasers on singlemode fiber are prone to additional problems such as nonlinear noise sources. Since many existing data centers have been planned with much longer link distances, there is expected to be a need for ten and forty gigabit repeaters and channel extenders; however these devices are expensive and must be located at inconvenient places along the link path. It is desirable to overcome the dispersion limit of high speed data links, and thereby achieve much longer working distances without repeaters on singlemode fiber.

In order to compensate for singlemode dispersion, a method is required for narrowing the widths of optical pulses being launched into the fiber, without resorting to a special type of expensive laser device. It is known that launching a Gaussian optical pulse through a Gaussian wavelength selective bandpass filter will reduce the pulse width. There is a tradeoff of pulse width vs. optical power. A higher power transmitter is required, but this can be easily achieved with current transceiver designs simply by increasing the laser bias current. However, it is not practical to implement this tradeoff unless a controlled method exists for matching the center wavelength of an arbitrarily chosen laser to the center of a filter passband. Otherwise, the optical loss between the laser and filter becomes too great and any advantages from reducing the pulse width are lost. One method and system for narrowing the widths of optical pulses is disclosed in copending patent application Ser. No. 09/865,256, for "Apparatus and Method for Wavelength-Locked Loop for Systems and Applications Employing Electromagnetic Signals," filed May 22, 2001, the disclosure of which is hereby incorporated herein in its entirety by reference. The present invention is an improvement on the system described in this copending application.

SUMMARY OF THE INVENTION

An object of this invention is to extend the distance for high data rate protocols such as ten and forty Gigabit Ethernet Links and Synchronous Optical Networks (SONET) using dispersion compensation.

Another object of the present invention is to overcome the dispersion limit of high speed optical data links, and thereby achieve much longer working distances without repeaters on singlemode fiber.

A further object of this invention is to compensate for dispersion of a modulated laser signal on a singlemode fiber by narrowing the width of optical pulses being launched into the fiber.

These and other objectives are attained with a method and system for dispersion control of electromagnetic signals in communication networks by narrowing the widths of electromagnetic pulses such as modulated laser signals. Generally, in the preferred embodiment, the present invention utilizes a feedback loop based on dither frequency modulation which dynamically adjusts the alignment of the laser center frequency with the filter passband. In this way, there is an acceptable tradeoff between optical power and pulse width, so a higher power laser can be used to generate a narrower optical pulse. The narrower pulses then travel farther in the fiber link before reaching their dispersion limit. It is believed that, by using this invention, existing link distance could be doubled, while re-using existing installed singlemode fiber.

The systems employing the feedback loop may be information carrying or control systems employing electromagnetic waves including those waves at radio frequency, microwave frequency and optical frequency portions of an electromagnetic frequency spectrum. Thus, the electromagnetic signals may comprise radio frequency signals, microwave signals, and optical signals.

When employed in laser/optical networks, the system and method of the present invention may be used to tune laser diode devices, and/or compensate for any type of wavelength-selective element in the network, including wavelength selective filters, attenuators, and switches, in fiber Bragg gratings, ring resonators in optical amplifiers, external modulators such as acousto-optic tunable filters, or array waveguide gratings. This applies to many other optical components in the network as well (for example, optical amplifiers that may act as filters when operating in the nonlinear regime). Furthermore, the system and method of the invention may be used to implement less expensive devices for all of the above application areas.

Alternately, the system and method of the invention may be implemented to tune such devices for Wavelength Division Multiplexing (WDM) and optical network applications, in real-time, during manufacture, e.g., tuning all lasers to a specific wavelength. This would significantly increase lot yields of laser devices which otherwise may be discarded as not meeting wavelength specifications as a result of manufacture process variations, for example.

Further benefits and advantages of the invention will become apparent from a consideration of the following detailed description, given with reference to the accompanying drawings, which specify and show preferred embodiments of the invention.

DETAILED DESCRIPTION OF THE PREFERRED EMBODIMENTS

Figure 1:
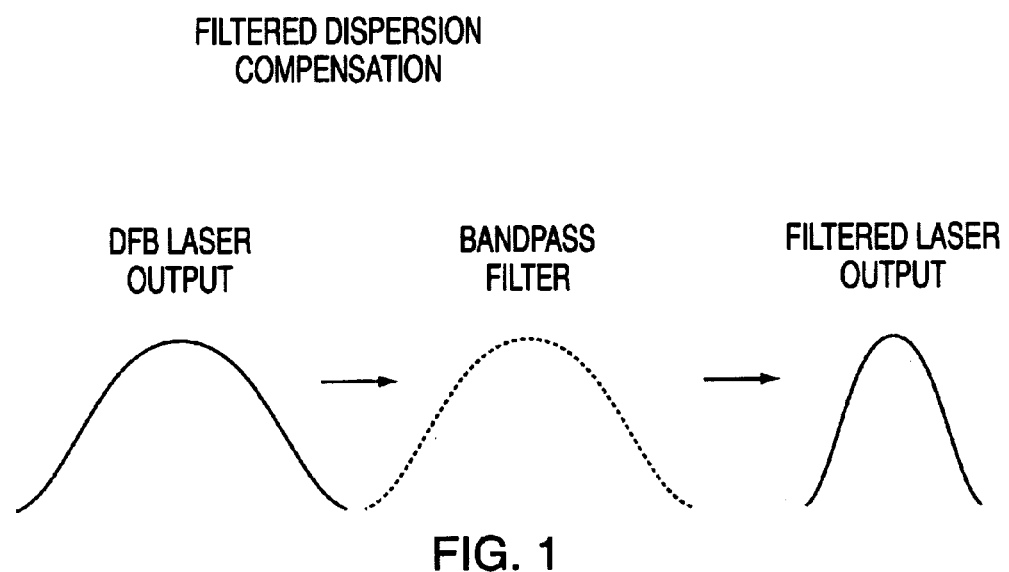
FIG. 1 generally illustrates pulse narrowing

The technique of pulse narrowing by using optical filters is shown in FIG. 1. Although it is not intuitive, it can be shown that a Gaussian shaped optical pulse becomes narrowed when passing through a Gaussian bandpass filter, even if the filter bandwidth is larger than the original laser pulse bandwidth. Mathematically, this happens because both the laser pulse shape and the filter response are Gaussian shaped in both time and frequency domains; passing light through such a filter thus results in the convolution of two Gaussian pulses, which is itself a Gaussian pulse with narrower width. Details of such pulse narrowing are given in many standard optics texts such as P. Das, Optical Signal Process, Springer-Verlag (191) or H. Dutton, Optical Communication, Academic Press (1993).

In principle, a Gaussian bandpass filter can be used to narrow the width of output pulses from a direct modulated semiconductor laser diode; narrower pulses would be able to tolerate higher dispersion (pulse spreading) and thus overcome the dispersion distance limits on an optical link. However, due to inherent limitations in the mass production of optical filters and lasers, a range of optical center wavelengths is obtained. If there is a mismatch between the laser and filter center wavelength, then the significant excess optical loss (3–4 dB or more) negates any benefits obtained from the dispersion compensation. This invention presents a method for precisely aligning the center wavelengths of an arbitrary laser and filter combination, making dispersion compensation practical for high data rate links using direct modulated semiconductor lasers.

Figure 2:
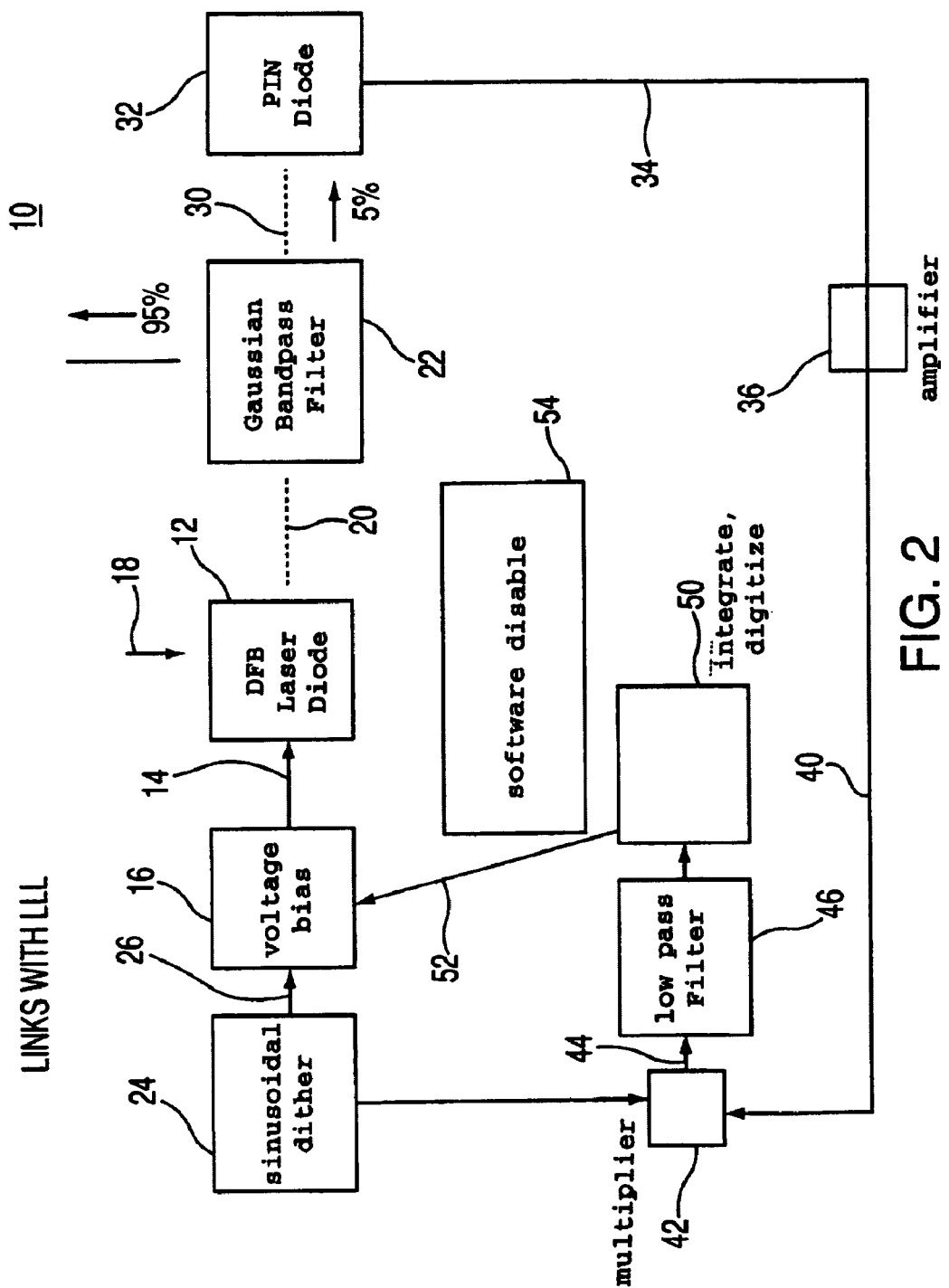
FIG. 2 shows a system embodying this invention

FIG. 2 shows a preferred system 10 embodying this invention. Generally, in ten Gbit and above systems, a distributed feedback laser diode is often used for direct current modulation application. An optical filter is employed having a Gaussian bandpass filter. More specifically, optical system 10 includes a light source such as laser diode 12 driven with both a bias voltage 14 from a voltage bias circuit 16, and modulated data 18 from a data source (not shown). The laser diode generates an optical (laser light) signal 20 that is received by a bandpass filter 22 or other suitable frequency selective device including but not limited to: thin film optical interference filters, acousto-optic filters, electro-optic filters, diffraction gratings, prisms, fiber Bragg gratings, integrated optics interferometers, electroabsorption filters, and liquid crystals. The laser diode itself may comprise a standard Fabry Perot or any other type (e.g., Vertical Cavity Surface Emitting (VCSEL)), light emitting diodes, or may comprise a Distributed Feedback semiconductor laser diode (DFB) such as commonly used for wavelength multiplexing.

Preferably, the laser diode emits light in the range of 850 nm to 1550 nm wavelength range. As mentioned, the bandpass filter may comprise a thin film interference filter comprising multiple layers of alternating refractive indices on a transparent substrate, e.g., glass.

As further shown in FIG. 2, there is an added sinusoidal dither modulation circuit or oscillator 24 for generating a sinusoidal dither modulation signal 27 that modulates the laser bias voltage. The sinusoidal dither signal may be electronically produced, e.g., by varying the current for a laser, or mechanically, by varying the micro-electromechanical system's (MEMS) mirror to vary the wavelength. The dither modulation frequency is on the order of a few kilohertz (kHz) but may range to the Megahertz range. Preferably, the dither modulation frequency is much less than the data rate which is typically on the order of 1–10 GHz. Modulation of the laser diode bias current 14 in this manner causes a corresponding dither in the laser center wavelength. Modulated data is then imposed on the laser, and the optical output passes through the bandpass filter 22.

Preferably, the filter 22 is designed to tap off a small amount of light 30, for example, which is incident upon a photo detector receiver device, e.g., P-I-N diode 32, and converted into an electrical feedback signal 34. The amount of light that may be tapped off may range anywhere between one percent (1%) to five percent (5%) of the optical output signal, for example, however, skilled artisans will appreciate that other amounts of laser light above the noise level that retain the integrity of the output signal including the dither modulation characteristic, may be tapped off. The remaining laser light passes on through the filter 22 to the optical network (not shown).

As the PIN diode output 34 is a relatively weak electric signal, the resultant feedback signal is amplified by amplifier device 36 to boost the signal strength. The amplified electric feedback signal 40 is input to a multiplier device 42 where it is combined with the original dither modulation signal. The cross product signal 44 that results from the multiplication of the amplified PIN diode output (feedback signal) and the dither signal includes terms at the sum and difference of the dither frequencies. The result is thus input to a low pass filter device 46 where it is low pass filtered and then averaged by integrator circuit 50 to produce an error signal 52 which is positive or negative depending on whether the laser center wavelength is respectively less than or greater than the center point of the bandpass filter.

This error signal is then used to adjust the dither modulation of the laser diode, adjusting its center wavelength to more closely align with the center wavelength of the optical filter. In particular, the error signal may be applied to the laser bias voltage device 16, where it may be added (e.g., by an adder device, not shown) in order to correct the laser bias current 14 in the appropriate direction. In this manner, the bias current (and laser wavelength) will increase or decrease until it exactly matches the center of the filter passband. Alternately, the error signal 52 may be first converted to a digital form, prior to being applied to the bias voltage device 16.

When the two center wavelengths are in alignment, the feedback error-signal is frequency-doubled and there is no change to the laser center wavelength. In this manner, the laser and filter center wavelengths are kept in alignment with each other through a dynamic feedback loop. In one embodiment, the laser/filter combination is aligned when the optical link is initialized (this can be done under the control of software 54, for example) and the loop keeps the laser and filter in alignment while data is being transferred. In another embodiment, the feedback loop is deactivated after the initial alignment is completed; this assumes the environment is stable enough to maintain the laser and fiber center wavelengths in alignment while the link is operating, and that realignment is not required until the link is re-initialized at some later time. An application with frequency re-initializations such as multi-gigabit datacom link might benefit from the second example. This approach is viable for long wavelength laser diodes in the 1300 nm to 1550 nm range, which are typically highly coherent and offer relatively narrow input spectra to begin with.

Figure 3:
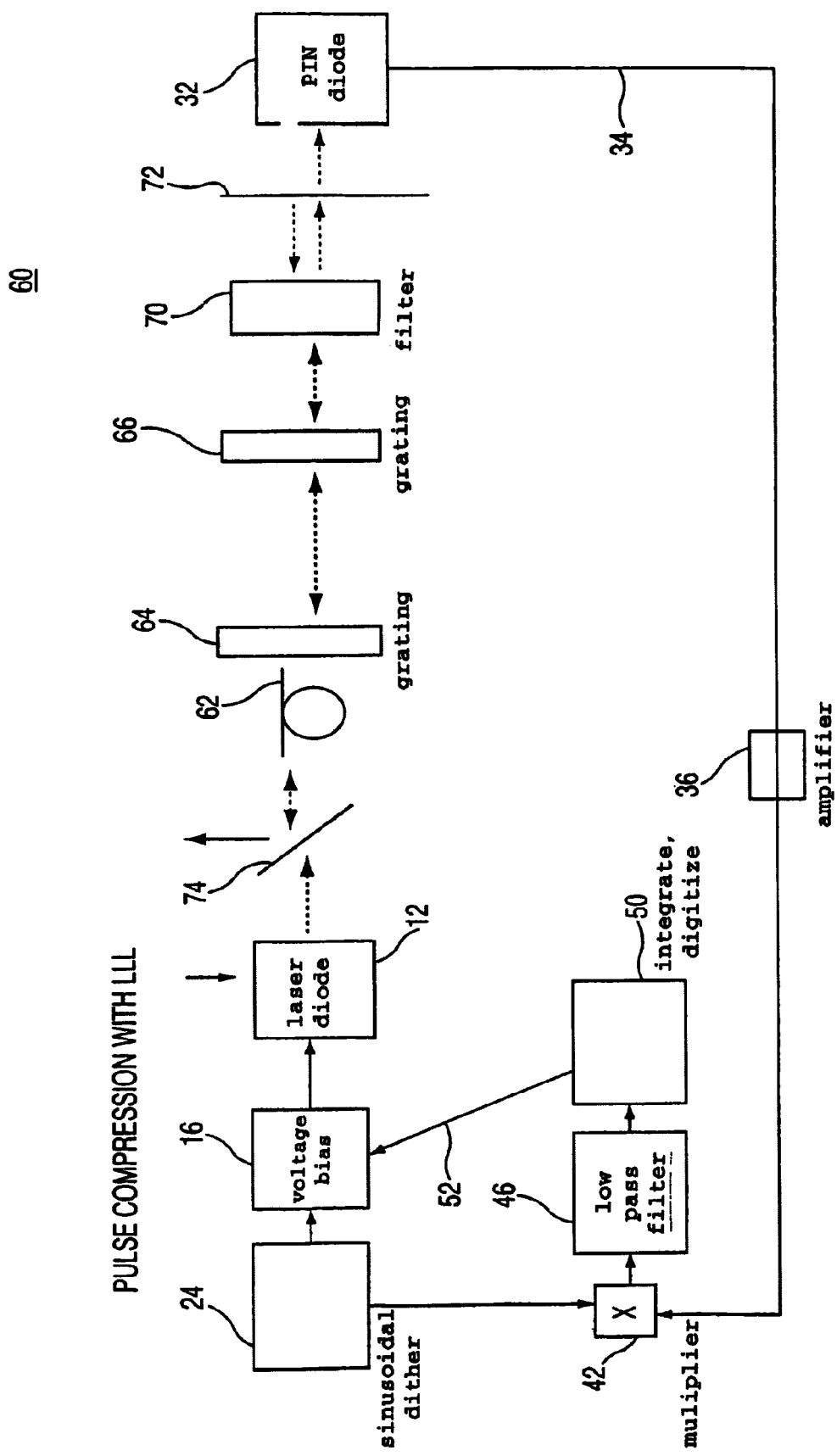
FIG. 3 depicts an alternate system embodying the present invention.

An alternate embodiment uses wavelength locked loops in a dual pulse compression system 60 as shown in FIG. 3. This implementation is only possible for long wavelength (1300 nm or 1550 nm) laser diodes as it requires both normal and anomalous dispersion to occur in the pulse compression system. It has been shown previously that the output of a laser diode can be compressed in time if the signal is passed through alternating regions of positive and negative group velocity dispersion, with an intermediate step of spectral filtering. Such an approach is shown in FIG. 3, where the dispersion is achieved through a combination of optical fiber 62 and a pair of diffraction gratings 64, 66 with a spatial filter 70 in the grating plane. Incident light passes through the fiber 62, which induces a linear frequency chirp; the gratings then spread the optical spectrum out in space (the grating output plane is actually the Fourier transform of the incident light).

A filter 70 in this plane selectively adjusts the optical spectrum components, and a mirror 72 then reverses the process; the output light is taken from a beam splitter 74, and is significantly compressed in time. This type of pulse compression has, per se, been described elsewhere; see for example C. DeCusatis and P. Das, "Spread spectrum techniques in optical communication using transform domain processing", IEEE Journ. Selected Areas in comm. (special issue on microelectronics and photonics in communications), vol. 8, p. 1608–1616 (1990). One of the limitations in optical pulse compression schemes is the transform domain filtering, which can lead to high optical loss. In this embodiment, a wavelength locked loop is incorporated into the pulse compression scheme as shown. In this manner, the spectrum of the input optical pulse which has passed through the fiber and gratings is exactly matched to the filter bandpass by the wavelength locked loop. This overcomes the excessive loss in the pulse compression system, and results in narrower optical output pulses than can otherwise be achieved.

The present invention may be embodied in many different types of specific systems. As described above, the invention may be used with Ethernet technology. This invention can also be used with other high data rate protocols such as Synchronous Optical Networks (SONET).

While it is apparent that the invention herein disclosed is well calculated to fulfill the objects previously stated, it will be appreciated that numerous modifications and embodiments may be devised by those skilled in the art, and it is intended that the appended claims cover all such modifications and embodiments as fall within the true spirit and scope of the present invention.

The invention claimed is:

1. A control circuit for narrowing the pulse width of electromagnetic signals in communication networks by aligning an electromagnetic signal having a peaked spectrum function including a center wavelength and a wavelength selective device implementing a peaked passband function including a center wavelength, said circuit comprising:

mechanism for applying a dither modulation signal at a dither modulation frequency to said electromagnetic signal, and inputting said dither modulated electromagnetic signal to said wavelength selective device to narrow the pulse width of the electromagnetic signal; and a feedback loop including i) mechanism for converting a portion of said dither modulated electromagnetic signal to an electric feedback signal, ii) mechanism for continuously comparing said feedback signal with said dither modulation signal and generating an error signal representing a difference between a frequency characteristic of said feedback signal and a dither modulation frequency, iii) mechanism for applying said error signal to better align the center wavelengths of the electromagnetic signal and the wavelength selective device, wherein said center wavelength of said electromagnetic signal and said wavelength selective device center wavelength become aligned when said frequency characteristic of said feedback signal is two times said dither modulation frequency, and iv) mechanism to selectively prevent said error signal from being applied to better align said center wavelengths.

2. A circuit according to claim 1, wherein the mechanism to selectively prevent the error signal from being applied includes mechanism to prevent said error signal from being applied at defined times.

3. A circuit according to claim 1, for use with a system that receives and transmits said electromagnetic signal, and wherein said system and said control circuit are initialized and re-initialized at defined times; and wherein:

the mechanism to selectively prevent the error signal from being applied includes mechanism to allow said error signal to be applied to better align said center wavelengths only at said defined times.

4. A circuit according to claim 1, wherein the mechanism to selectively prevent the error signal from being applied include mechanism to disable the feedback loop at defined times.

5. A circuit according to claim 1, wherein said electromagnetic signal is a laser signal having a wavelength between 1300 nm and 1550 nm.

6. A method for narrowing the pulse width of electromagnetic signals in communication networks by mutually aligning a center wavelength of an electromagnetic signal having a peaked spectrum function with a center wavelength of a wavelength selective device implementing a peaked passband function, said method comprising the steps of:

a) applying a dither modulation signal at a dither modulation frequency to said electromagnetic signal operating at a specific wavelength, and inputting said dither modulated electromagnetic signal to said wavelength selective device having a peak frequency response at a desired wavelength to narrow the pulse width of the electromagnetic signal;

b) converting a portion of said dither modulated electromagnetic signal to an electric feedback signal;

c) selectively comparing said feedback signal with said dither modulation signal and generating an error signal representing a difference between a frequency characteristic of said feedback signal and a dither modulation frequency;

d) applying said error signal to better align the center wavelengths of electromagnetic signal and the wavelength selective device, wherein said center wavelength of said electromagnetic signal and said wavelength selective device center wavelength become aligned when said frequency characteristic of said feedback signal is two times said dither modulation frequency; and e) selectively preventing the error signal from being applied to better align said center wavelengths.

7. A method according to claim 6, wherein the selectively preventing step includes the step of preventing said error signal from being applied at defined times.

8. A method according to claim 6, for use with a system that receives and transmits said electromagnetic signal, and wherein said system is initialized and re-initialized at defined times, and wherein the selectively preventing step includes the step of preventing said error signal from being applied at all times except said defined times.

9. A method according to claim 6, wherein the selectively preventing step includes the step of preventing the error signal from being generated at defined times.

10. A method according to claim 6, wherein said electromagnetic signal is a laser signal having a wavelength between 1300 nm and 1550 nm.

11. A control circuit for adjusting an electromagnetic signal having a peaked spectrum function including a center wavelength, said circuit comprising:
 mechanism for applying a dither modulation signal at a dither modulation frequency to said electromagnetic signal;
 a compression subcircuit for compressing the electromagnetic signal, and including
  first and second dispersion mechanisms, located in series, for receiving the dither modulated electromagnetic signal and spreading the spectrum of said electromagnetic signal out in space, and
  ii) a spectral filter, located in series with the first and second dispersion mechanisms, for adjusting the spectrum of the electromagnetic signal, wherein the spectral filter implements a peaked passband function including a center wavelength; and
 a feedback loop including
  i) mechanism for converting a portion of said dither modulated electromagnetic signal to an electric feedback signal,
  ii) mechanism for continuously comparing said feedback signal with said dither modulation signal and generating an error signal representing a difference between a frequency characteristic of said feedback signal and a dither modulation frequency; and
  iii) mechanism for adjusting the peak spectrum function of said electromagnetic signal according to said error signal, wherein said center wavelength of said electromagnetic signal and said spectral filter center wavelength become aligned when said frequency characteristic of said feedback signal is two times said dither modulation frequency.

12. A circuit according to claim 11, wherein:
 the first and second dispersion mechanisms include, respectively, first and second diffraction gratings.

13. A circuit according to claim 12, wherein the spectral filter includes a spatial filter located in series with the first and second diffraction gratings.

14. A circuit according to claim 11, wherein the compression subcircuit further includes a mirror for receiving the electromagnetic signal, and reflecting the electromagnetic signal back through the first and second dispersion mechanisms and the spectral filter; and a portion of the electromagnetic signal passes through the mirror and is incident on said mechanism for converting to produce said electric feedback signal.

15. A method for adjusting a center wavelength of an electromagnetic signal of having a peaked spectrum function, said method comprising the steps of:
 a) applying a dither modulation signal at a dither modulation frequency to said electromagnetic signal operating at a specific wavelength;
 b) inputting said dither modulated electromagnetic signal to a compression subcircuit for compressing the electromagnetic signal, including the steps of (1) transmitting the dither modulated electromagnetic signal through first and second dispersion mechanisms to spread the spectrum of said electromagnetic signal out in space, and (2) passing the electromagnetic signal through a spectral filter, located in series with the first and second dispersion mechanisms, for adjusting the spectrum of the electromagnetic signal, wherein the spectral filter implements a peaked passband function including a center wavelength;
 c) converting a portion of said dither modulated electromagnetic signal to an electric feedback signal;
 d) continuously comparing said feedback signal with said dither modulation signal and generating an error signal representing a difference between a frequency characteristic of said feedback signal and the dither modulation frequency; and
 e) adjusting the peak spectrum function of said electromagnetic signal according to said error signal, wherein said center wavelength of said electromagnetic signal and said spectral filter center wavelength become aligned when said frequency characteristic of said feedback signal is two times said dither modulation frequency.

16. A method according to claim 15, wherein the first and second dispersion mechanisms include, respectively, first and second diffraction gratings.

17. A method according to claim 16, wherein the spectral filter includes a spatial filter located in series with the first and second diffraction gratings.

18. A method according to claim 15, further comprising the step of using a mirror for receiving the electromagnetic signal and reflecting the electromagnetic signal back through the first and second dispersion mechanisms and the spectral filter; and wherein the converting step includes the step of converting a portion of the electromagnetic signal passing through the mirror to the electric feedback signal.

* * * * *